(12) United States Patent
Bradley, Jr. et al.

(10) Patent No.: US 11,215,741 B2
(45) Date of Patent: Jan. 4, 2022

(54) ANGLE OF INCIDENCE RESTRICTION FOR OPTICAL FILTERS

(71) Applicant: VIAVI Solutions Inc., San Jose, CA (US)

(72) Inventors: Richard A. Bradley, Jr., Santa Rosa, CA (US); Tim Gustafson, Santa Rosa, CA (US)

(73) Assignee: VIAVI Solutions Inc., San Jose, CA (US)

(*) Notice: Subject to any disclaimer, the term of this patent is extended or adjusted under 35 U.S.C. 154(b) by 470 days.

(21) Appl. No.: 16/164,225

(22) Filed: Oct. 18, 2018

(65) Prior Publication Data

US 2019/0219748 A1 Jul. 18, 2019

Related U.S. Application Data

(60) Provisional application No. 62/618,372, filed on Jan. 17, 2018.

(51) Int. Cl.
*G02B 5/20* (2006.01)
*G01J 1/04* (2006.01)
*G02B 5/28* (2006.01)

(52) U.S. Cl.
CPC ............ *G02B 5/208* (2013.01); *G01J 1/0488* (2013.01); *G02B 5/281* (2013.01); *G02B 5/285* (2013.01)

(58) Field of Classification Search
None
See application file for complete search history.

(56) References Cited

U.S. PATENT DOCUMENTS

| | | | | |
|---|---|---|---|---|
| 8,314,991 B2* | 11/2012 | Li | ............ | G02B 5/288 359/588 |
| 9,568,362 B2* | 2/2017 | Ockenfuss | ........... | A61B 5/1459 |
| 10,451,783 B2* | 10/2019 | Ockenfuss | ............... | G02B 5/28 |
| 2009/0002830 A1 | 1/2009 | Okamoto | | |
| 2009/0294634 A1 | 12/2009 | Kurahashi et al. | | |
| 2014/0014838 A1* | 1/2014 | Hendrix | ................. | G02B 5/281 250/338.1 |

(Continued)

FOREIGN PATENT DOCUMENTS

| CN | 101389982 A | 3/2009 |
|---|---|---|
| CN | 101592849 A | 12/2009 |

(Continued)

OTHER PUBLICATIONS

Hassibi et al., "A Fully Integrated CMOS Fluorescence Biochip for Multiplex Polymerase Chain-Reaction (PCR) Processes", 2017 IEEE International Solid-State Circuits Conference, Feb. 2017, 3 pages.

(Continued)

*Primary Examiner* — Derek S. Chapel
(74) *Attorney, Agent, or Firm* — Harrity & Harrity, LLP (57) ABSTRACT

A filter may include a first component filter associated with a first angle shift and a first passband. The filter may include a second component filter associated with a second angle shift and a second passband, wherein the first angle shift, the first passband, the second angle shift, and the second passband are configured to make the filter transmissive to a spectral range of light at a first angle of incidence and reflective to the spectral range of light at a second angle of incidence.

20 Claims, 8 Drawing Sheets

(56) References Cited

U.S. PATENT DOCUMENTS

| | | | |
|---|---|---|---|
| 2015/0234179 A1* | 8/2015 | Shpunt | G02B 26/105 |
| | | | 359/212.2 |
| 2016/0238759 A1* | 8/2016 | Sprague | C23C 14/3414 |
| 2020/0408977 A1* | 12/2020 | Eisenhammer | C23C 14/10 |

FOREIGN PATENT DOCUMENTS

| | | |
|---|---|---|
| JP | H0743528 A | 2/1995 |
| WO | 2010051231 A1 | 5/2010 |

OTHER PUBLICATIONS

Hassibi et al., "A Fully Integrated CMOS Fluorescence Biochip for Multiplex Polymerase Chain Reaction (PCR) Processes", 4.2: A Fully Integrated CMOS Fluorescence Biochip for Multiplex PCR Processes, Feb. 2017, 35 pages.

Manickam et al., "A Fully Integrated CMOS Fluorescence Biochip for DNA and RNA Testing", IEEE Journal of Solid-State Circuits, vol. 52, No. 11, Nov. 2017, 14 pages.

Extended European Search Report for Application No. EP19150114. 7, dated May 27, 2019, 8 pages.

* cited by examiner

ANGLE OF INCIDENCE RESTRICTION FOR OPTICAL FILTERS

RELATED APPLICATION

This application claims priority under 35 U.S.C. § 119 to U.S. Provisional Patent Application No. 62/618,372 filed on Jan. 17, 2018, the content of which is incorporated by reference herein in its entirety.

BACKGROUND

A coating system may be used to coat a substrate with a particular material. For example, a pulsed direct current (DC) magnetron sputtering system may be used for deposition of thin film layers, thick film layers, and/or the like. Based on depositing a set of layers, an optical element may be formed. For example, a thin film may be used to form a filter, such as an optical interference filter, a low angle shift filter, a collimator, and/or the like. In some cases, the optical element may be associated with providing a particular functionality at a particular wavelength of light. For example, a bandpass filter may be used for filtering a near-infrared range of light, a visible range of light, an ultraviolet range of light, and/or the like.

In an example, an optical transmitter may emit near-infrared light that is directed toward an object. In this case, for a gesture recognition system, the optical transmitter may transmit the near-infrared light toward a user and the near-infrared light may be reflected off the user toward an optical receiver. The optical receiver may capture information regarding the near-infrared light, and the information may be used to identify a gesture being performed by the user. For example, a device may use the information to generate a three dimensional representation of the user, and to identify the gesture being performed by the user based on the three dimensional representation.

In another example, information regarding the near-infrared light may be used to recognize an identity of the user, a characteristic of the user (e.g., a height or a weight), a characteristic of another type of target (e.g., a distance to an object, a size of the object, a shape of the object, a spectroscopic signature of the object, or a fluorescence of the object), and/or the like. However, during transmission of the near-infrared light toward the user and/or during reflection from the user toward the optical receiver, ambient light may interfere with the near-infrared light. Thus, the optical receiver may be optically coupled to an optical filter, such as a bandpass filter, a collimator, a low angle-shift filter, and/or the like to allow near-infrared light to pass through toward the optical receiver. Similarly, the optical receiver may be optically coupled to an aperture to restrict stray light from being passed to the optical receiver.

SUMMARY

According to some possible implementations, a composite optical filter may include a substrate. The composite optical filter may include a first component optical filter disposed onto the substrate, wherein the first component optical filter is associated with a first angle shift. The composite optical filter may include a second component optical filter disposed onto the first component optical filter, wherein the second component optical filter is associated with a second angle shift that is different from the first angle shift, wherein the composite optical filter is configured to be transmissive to light at a first range of angles of incidence and is configured to block light at a second range of angles of incidence that is different from the first range of angles of incidence.

According to some possible implementations, an optical system may include an optical filter including a plurality of component optical filters configured to filter an input optical signal and provide a filtered input optical signal, wherein the plurality of component optical filters is configured to block a first portion of the input optical signal that does not satisfy an angle of incidence threshold and to pass a second portion of the input optical signal that does satisfy the angle of incidence threshold. The optical system may include an optical sensor configured to receive the filtered input optical signal and provide an output electrical signal.

According to some possible implementations, a filter may include a first component filter associated with a first angle shift and a first passband. The filter may include a second component filter associated with a second angle shift and a second passband, wherein the first angle shift, the first passband, the second angle shift, and the second passband are configured to make the filter transmissive to a spectral range of light at a first angle of incidence and reflective to the spectral range of light at a second angle of incidence.

DETAILED DESCRIPTION

The following detailed description of example implementations refers to the accompanying drawings. The same reference numbers in different drawings may identify the same or similar elements.

An optical sensor device may include a sensor element array of sensor elements to receive light initiating from an optical source, such as an optical transmitter, a light bulb, an ambient light source, and/or the like. For example, in a spectrometer, the optical sensor device may include an array of sensor elements to receive light reflected off a target object, thereby enabling an identification of the target object. A sensor element may be associated with an optical filter that filters light to the sensor element to enable the sensor element to obtain information regarding a particular spectral range of electromagnetic frequencies. For example, the sensor element may be aligned with an optical filter with a passband in a near-infrared (NIR) spectral range, a visible spectral range, an ultraviolet spectral range, and/or the like. An optical filter may include one or more layers to filter a portion of the light.

However, filter performance of an optical filter may be degraded when an angle of incidence (AOI) of light directed toward the optical filter changes from a configured incidence (e.g., 0 degrees, 45 degrees, 90 degrees, etc.) to a threshold angle of incidence (e.g., greater than approximately 30 degrees deviation from the configured incidence). In this case, band edges may experience blue shift to shorter wavelengths. Moreover, polarization effects may become significant for the optical filter when the angle of incidence changes from a configured incidence (e.g., a normal incidence, a non-normal selected incidence, etc.) to a threshold angle of incidence (e.g., greater than a threshold level of effect). An aperture may be disposed in alignment with the optical filter to restrict an angle of incidence to between a configured incidence and less than a threshold deviation from the configured incidence. In this way, effects resulting from light being directed to the optical filter or another type of optical element at greater than a threshold angle of incidence may be avoided.

However, inclusion of an aperture may result in excessive cost to manufacture an optical package that includes the optical filter and/or excessive package size for the optical package. Moreover, in some cases, it may be desirable to allow light with greater than a threshold angle of incidence to be directed toward an optical filter and to block light with less than or equal to the threshold angle of incidence from being directed toward the optical filter to perform field flattening. In this case, a field flattener may be optically coupled to an optical filter or another type of optical element. However, inclusion of a field flattener lens may result in excessive size, cost, and/or manufacturing complexity for an optical package.

Some implementations, described herein, provide an optical filter, optical device, optical element, optical module, optical system, and/or the like with two optical filters deposited on a common substrate surface location to restrict an angle of incidence of light. For example, a composite optical filter may include a first component optical filter that is a low angle shift (e.g., less than a threshold angle shift) optical filter associated with a first passband, and a second component optical filter that is a high angle shift (e.g., greater than or equal to the threshold angle shift) optical filter associated with a second passband. In this way, the composite optical filter may transmit light at a configured angle of incidence and reflect or block light at greater than a threshold angle of incidence. In this way, effects of greater than a threshold angle of incidence may be avoided without inclusion of an aperture, thereby reducing cost, manufacturing complexity, size, and/or the like of an optical package that includes the composite optical filter. Alternatively, based on configuring passbands of the component optical filters, the composite optical filter may be configured to block light at less than or equal to the threshold angle of incidence and pass through light at greater than the threshold angle of incidence. In this way, a composite optical filter may be perform field flattening with reduced size, complexity, and/or cost relative to using a field flattener lens.

Figure 1:
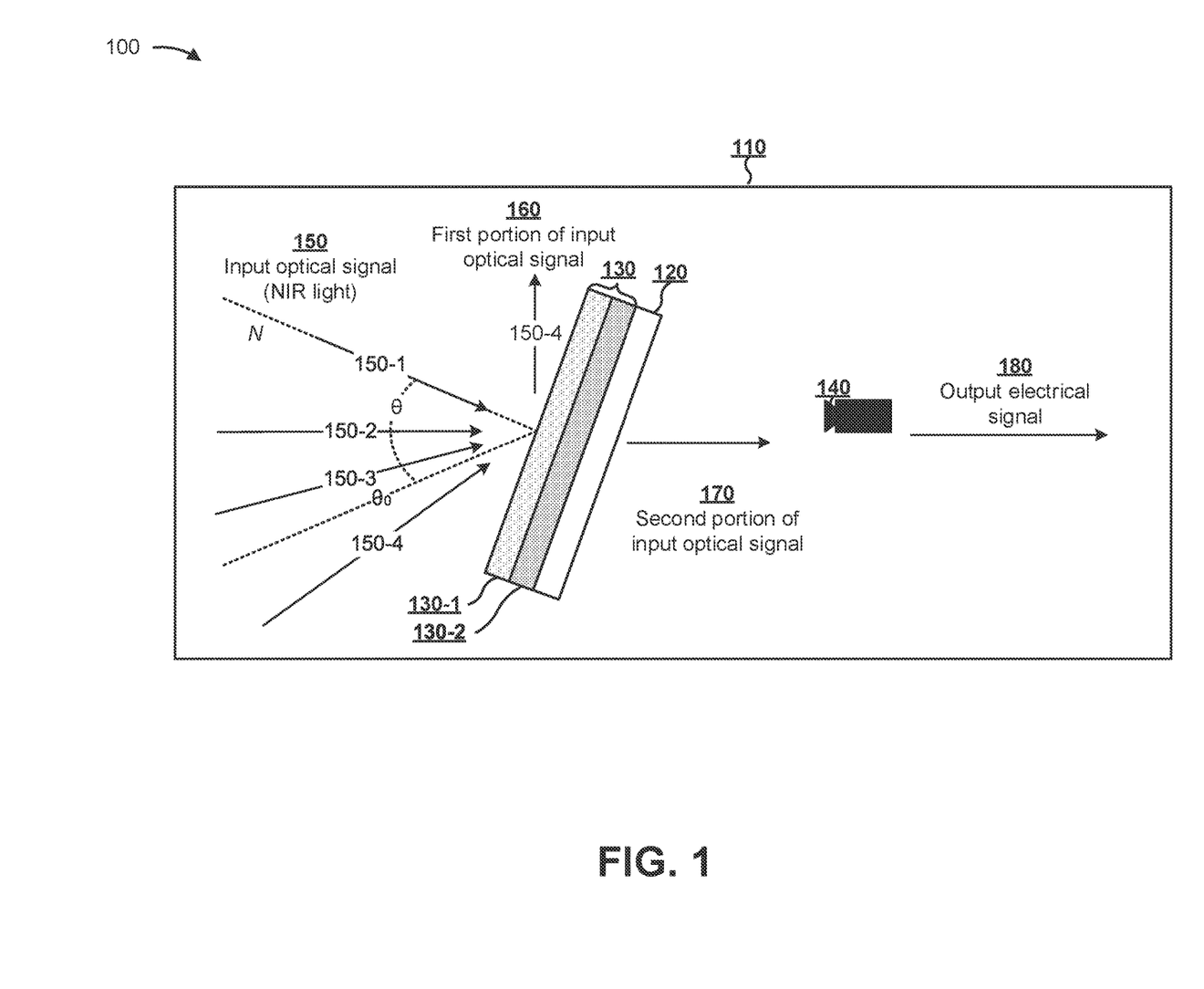
FIG. 1 is a diagram of an overview of an example implementation described herein.

FIG. 1 is a diagram of an overview of an example implementation 100 described herein. As shown in FIG. 1, example implementation 100 includes a sensor system 110. Sensor system 110 may be a portion of an optical system, and may provide an electrical output corresponding to a sensor determination. For example, sensor system 110 may be a portion of a spectroscopic system, a gesture recognition system, an object recognition system, a motion tracking system, a communications system, and/or the like.

In some implementations, sensor system 110 may include an optical filter structure 120, which may include a composite optical filter 130, and an optical sensor 140. In some implementations, composite optical filter 130 may include a set of component optical filters 130-1 and 130-2. For example, composite optical filter 130 may include a first component optical filter 130-1 that is a high angle shift optical filter (e.g., an optical filter associated with greater than a threshold angle shift) and a second component optical filter 130-2 (e.g., an optical filter associated with less than or equal to the threshold angle shift) that is a low angle shift optical filter. In this way, composite optical filter 130 may be configured to restrict an angle of incidence with which incident light may be passed through composite optical filter 130.

Although some implementations, described herein, may be described in terms of an optical filter in a sensor system, some implementations described herein may be used in another type of system, in an optical element external to a sensor system, in an optical element of an optical package, and/or the like.

As further shown in FIG. 1, and by reference number 150, an input optical signal is directed toward optical filter structure 120 at a set of angles of incidence. For example, input optical signals 150-1 through 150-4 may be directed toward optical filter structure 120 at the set of angles of incidence. In this case, input optical signal 150-1 may be directed at optical filter structure 120 at a configured angle of incidence (N). Similarly, input optical signals 150-2 and 150-3 may be directed at optical filter structure 120 at angles of incidence less than a threshold angle (e.g., less than $\theta_0$). In contrast, input optical signal 150-4 may be directed at optical filter structure 120 at greater than or equal to the threshold angle of incidence (e.g., greater than or equal to $\theta_0$). In some implementations, the threshold angle of incidence may relate to a transmissivity threshold. For example, the threshold angle of incidence may define an angle at which and/or greater than which an input optical signal is blocked or reflected, and an input optical signal may be termed to be blocked or reflected when less than a threshold percentage of the input optical signal is passed through composite optical filter 130.

As further shown in FIG. 1, and by reference number 160, a first portion of the input optical signal is reflected by optical filter structure 120. For example, based on input optical signal 150-4 being directed at optical filter structure 120 at greater than or equal to the threshold angle of incidence, composite optical filter 130 reflects input optical signal 150-4. For example, an angle shift of a passband of component optical filter 130-1 may result in respective passbands of component optical filter 130-1 and component optical filter 130-2 differing to cause input optical signal 150-4 to be blocked from passing through composite optical filter 130, as described in more detail herein.

As shown by reference number 170, a portion of the optical signal is passed through by composite optical filter 130 and optical filter structure 120. For example, based on input optical signals 150-1 through 150-3 being directed toward optical filter structure 120 at less than the threshold angle of incidence, composite optical filter 130 passes input optical signals 150-1 through 150-3 through towards optical sensor 140. In some implementations, composite optical filter 130 may be configured to block input optical signals associated with less than a threshold angle of incidence. For example, based on configuring passbands of component optical filters 130-1 and 130-2, composite optical filter 130 may be configured to block input optical signals 150-1 through 150-3 and to pass input optical signal 150-4, as described in more detail herein.

As shown by reference number 180, based on the portion of the optical signal being passed to optical sensor 140, optical sensor 140 may provide an output electrical signal for sensor system 110. For example, optical sensor 140 may provide an output electrical signal identifying an intensity of light, a characteristic of light (e.g., a spectroscopic signature), a wavelength of light, and/or the like. In this way, composite optical filter 130 utilizes a high angle shift filter and a low angle shift filter to restrict angles of incidence with which light may be passed through composite optical filter 130 without using an aperture. In this way, a cost, a complexity, and/or a size of optical filter structure 120 and/or sensor system 110 is reduced relative to use of an aperture to restrict angles of incidence with which light may be passed to optical sensor 140.

As indicated above, FIG. 1 is provided merely as an example. Other examples are possible and may differ from what was described with regard to FIG. 1.

Figure 2A:
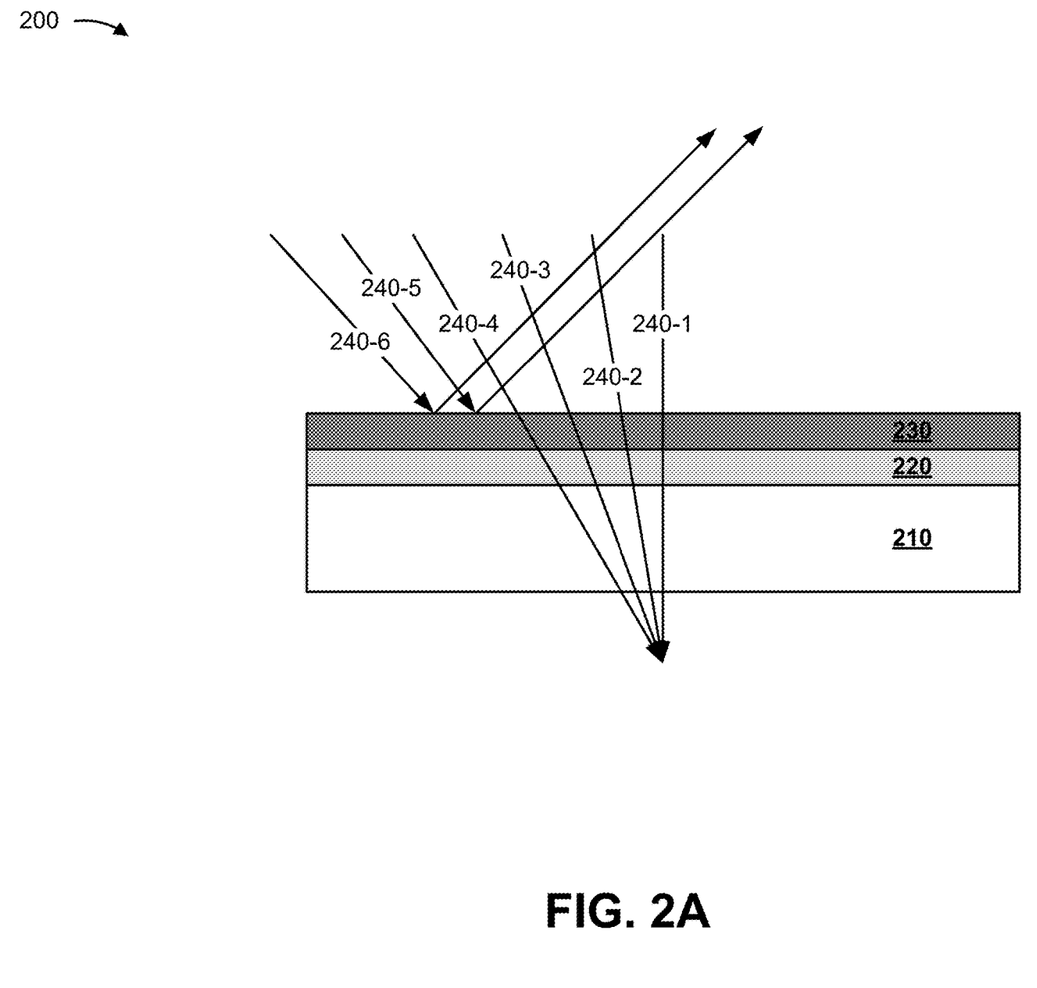
FIGS. 2A and 2B are diagrams of example implementations of optical filters described herein.
Figure 2B:
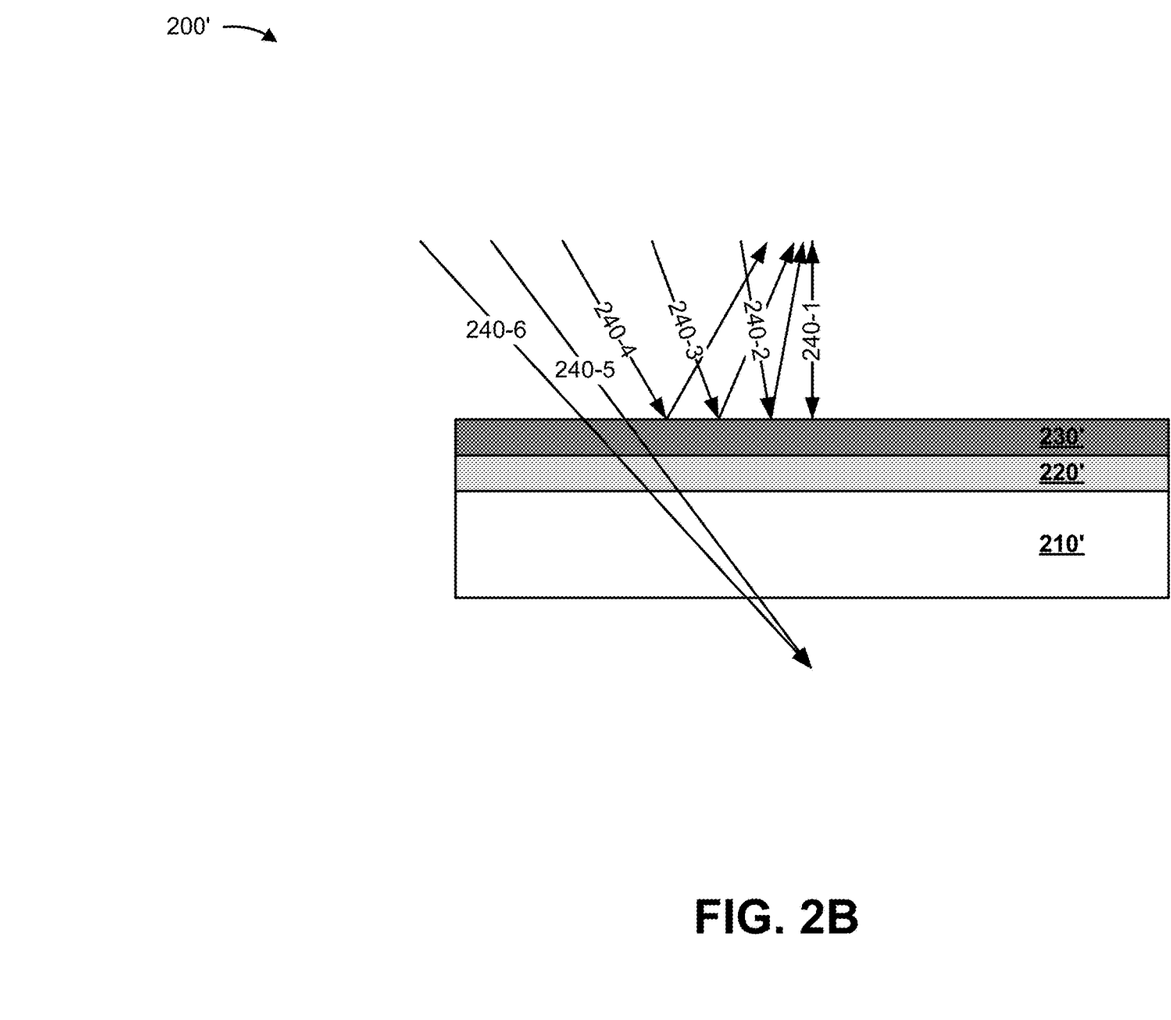

FIGS. 2A and 2B are diagrams of example optical filters 200/200'. As shown in FIG. 2A, optical filter 200 includes a substrate 210, onto which is disposed a first component optical filter 220 and a second component optical filter 230.

In some implementations, first component optical filter 220 may be a low angle shift filter. For example, first component optical filter 220 may be a low angle shift passband filter manufactured using a silver (Ag) based photopic coating. Additionally, or alternatively, first component optical filter 220 may be a low angle shift bandpass filter manufactured using hydrogenated silicon (Si:H). In some implementations, first component optical filter 220 may be associated with less than a threshold angle shift at greater than a threshold angle of incidence, as described in more detail here. For example, first component optical filter 220 may be associated with less than 20% angle shift, less than 10% angle shift, less than 5% angle shift, less than 1% angle shift, and/or the like at a particular range of angles of incidence. In this case, the particular range of angles of incidence may be a range of approximately 0 degrees to approximately 60 degrees, approximately 0 degrees to approximately 45 degrees, approximately 0 degrees to approximately 30 degrees, and/or the like.

In some implementations, first component optical filter 220 may be associated with less than a threshold thickness. For example, first component optical filter 220 may be associated with a thickness of less than approximately 600 nanometers (nm), less than approximately 2000 nm, less than approximately 5000 nm, and/or the like. In some implementations, first component optical filter 220 may be associated with multiple layers. For example, multiple layers may be deposited and/or patterned, such as using a photolithography procedure, to form first component optical filter 220. In some implementations, optical filter 200 may be associated with a particular size. For example, optical filter may be associated with a thickness of between approximately 10 nm and 5000 nm, a length of between 0.001 millimeter (mm) and 100 mm, and/or a width of between 0.01 mm and 100 mm.

In some implementations, second component optical filter 230 may be a high angle shift filter. For example, second component optical filter 230 may be a short wavelength pass high angle shift filter. In some implementations, second component optical filter 230 may be manufactured from a material with less than a threshold refractive index. For example, second component optical filter 230 may be a silicon dioxide ($SiO_2$) based filter, a tantalum pentoxide ($Ta_2O_5$) based filter, and/or the like. In some implementations, second component optical filter 230 may be associated with a threshold angle shift. For example, second component optical filter 230 may be associated with an angle shift of greater than 1%, greater than 5%, greater than 10%, greater than 20%, greater than 30%, and/or the like at a particular range of angles of incidence. In this case, the particular range of angles of incidence may be between approximately 0 degrees and approximately 90 degrees, approximately 10 degrees and approximately 60 degrees, approximately 30 degrees and approximately 45 degrees, and/or the like. In some implementations, the particular range of angles of incidence may be greater than approximately 30 degrees, greater than approximately 45 degrees, and/or the like.

In some implementations, second component optical filter 230 may be associated with less than a threshold thickness. For example, second component optical filter 230 may be associated with a thickness of less than approximately 2500 nanometers (nm), less than approximately 3600 nm, less than approximately 4000 nm, and/or the like. In some implementations, second component optical filter 230 may be associated with multiple layers. For example, multiple layers may be deposited and/or patterned, such as using a photolithography procedure and/or the like, to form second component optical filter 230.

In some implementations, second component optical filter 230 may overlap with first component optical filter 220. For example, second component optical filter 230 and first component optical filter 220 may overlap at approximately a configured incidence, thereby enabling a portion of light 240 to pass through to substrate 210. In this case, for light associated with less than a threshold angle of incidence (e.g., rays 240-1 through 240-4), light may pass through first component optical filter 220 and second component optical filter 230. In some implementations, second component optical filter 230 and first component optical filter 220 may partially overlap. For example, second component optical filter 230 may cover a portion of first component optical filter 220 aligned to a subset of sensor elements of a sensor element array, and may not cover another portion of first component optical filter 220 aligned to another subset of sensor elements of the sensor element array. In this way, optical filter 200 may restrict an angle of incidence of light directed to only a portion of the sensor element array.

In some implementations, greater than a threshold percentage of light may pass through first component optical filter 220 and second component optical filter 230 at less than the threshold angle of incidence. For example, first component optical filter 220 and second component optical filter 230 may permit, for light with an angle of incidence of less than approximately 60 degrees, less than approximately 45 degrees, less than approximately 30 degrees, and/or the like, greater than approximately 75% transmission, greater than approximately 90% transmission, greater than approximately 95% transmission, greater than approximately 99% transmission, greater than approximately 99.9% transmission, greater than approximately 99.99% transmission, approximately 99.999% transmission, and/or the like.

In contrast, for light associated with greater than or equal to the threshold angle of incidence (e.g., rays 240-5 and 240-6), light may be blocked from pass through first component optical filter 220 and second component optical filter 230. In this case, light may be reflected by first component optical filter 220 and second component optical filter 230. In some implementations, less than or equal to a threshold percentage of light may be blocked by first component optical filter 220 and second component optical filter 230 at greater than or equal to the threshold angle of incidence. For example, first component optical filter 220 and second component optical filter 230 may be associated with, for light with an angle of incidence of greater than or equal to approximately 30 degrees, greater than or equal to approximately 45 degrees, greater than or equal to approximately 60 degrees, and/or the like, less than or equal to approximately 50% transmission, less than or equal to approximately 25% transmission, less than or equal to approximately 10% transmission, less than or equal to approximately 5% transmission, less than or equal to approximately 1% transmission, and/or the like. In this case, optical filter 200 may block a threshold percentage of light, such as approximately 75%, approximately 90%, approximately 95%, approximately 99%, approximately 99.9%, approximately 99.99%, approximately 99.999%, and/or the like. In this way, use of a composite optical filter including a high angle shift component optical filter and a low angle shift component optical filter may obviate a need for an aperture, thereby enabling reduced manufacturing complexity, reduced cost, reduced package size, and/or the like for an optical device.

In some implementations, optical filter 200 may be associated with a particular spectral range for which optical filter 200 is to be transmissive at a first range of angles of incidence that satisfy an angle of incidence threshold and not transmissive at a second range of angles of incidence that do not satisfy the angle of incidence threshold. For example, optical filter 200 may be associated with a spectral range of between approximately 600 nanometers (nm) and approximately 1200 nm, approximately 700 nm and approximately 1100 nm, approximately 800 nm and approximately 1000 nm, and/or the like. Additionally, or alternatively, optical filter 200 may be associated with a spectral range of between approximately 1200 nm and approximately 2000 nm, approximately 1400 nm and approximately 1800 nm, approximately 1500 nm and approximately 1700 nm, and/or the like. Additionally, or alternatively, optical filter 200 may be associated with a spectral range of between approximately 200 nm and approximately 4000 nm, approximately 1000 nm and approximately 3000 nm, approximately 1500 nm and approximately 2500 nm, and/or the like. Additionally, or alternatively, optical filter 200 may be associated with a visible spectral range, a near infrared spectral range, an ultraviolet spectral range, a combination thereof, and/or the like.

In some implementations, optical filter 200 may include one or more other filters, such as a blocker, an edge filter, a bandpass filter, and/or the like. In some implementations, optical filter 200 may include a protective covering (e.g., to protect first component filter 220 and/or second component filter 230 from environment degradation). In some implementations, optical filter 200 may include layers of one or more other materials. For example, optical filter 200 may include, such as for first component optical filter 220 or second component optical filter 230, a silicon (Si) based material, a hydrogenated silicon (Si:H) based material, a germanium (Ge) based material, a hydrogenated germanium (Ge:H) based material, a silicon germanium (SiGe) based material, an aluminum (Al) based material, a silver (Ag) based material, a silicon dioxide ($SiO_2$) material, an aluminum oxide ($Al_2O_3$) material, a titanium dioxide ($TiO_2$) material, a niobium pentoxide ($Nb_2O_5$) material, a tantalum pentoxide ($Ta_2O_5$) material, a magnesium fluoride ($MgF_2$) material, a niobium titanium oxide (NbTiOx) material, a niobium tantalum pentoxide material ($NbTa_2O_5$), a zinc oxide material (ZnO), a platinum Pt) material, a gold (Au) material, and/or the like. In some implementations, optical filter 200 may form a collimator.

As shown in FIG. 2B, optical filter 200' may permit light with greater than or equal to the threshold angle of incidence to pass through, and may block light with less than the threshold angle of incidence from passing through. For example, optical filter 200' may include a first component optical filter 220' and a second component optical filter 230' deposited onto a substrate 210'. First component optical filter 220' may be a low angle shift filter and second component optical filter 230' may be a high angle shift filter. In this case, first component optical filter 220' and second component optical filter 230' may be configured such that a wavelength of light directed to optical filter 200' is transmissive to optical filter 200' at high angles of incidence (e.g., greater than or equal to the threshold angle of incidence), and is reflected at low angles of incidence (e.g., less than the threshold angle of incidence). In this way, optical filter 200' enables field flattening to reduce an intensity of light directed normal to optical filter 200'.

As indicated above, FIGS. 2A and 2B are provided merely as examples. Other examples are possible and may differ from what was described with regard to FIGS. 2A and 2B.

FIGS. 3A-3E are diagrams 300-360 of characteristics of optical filters described herein.

Figure 3A:
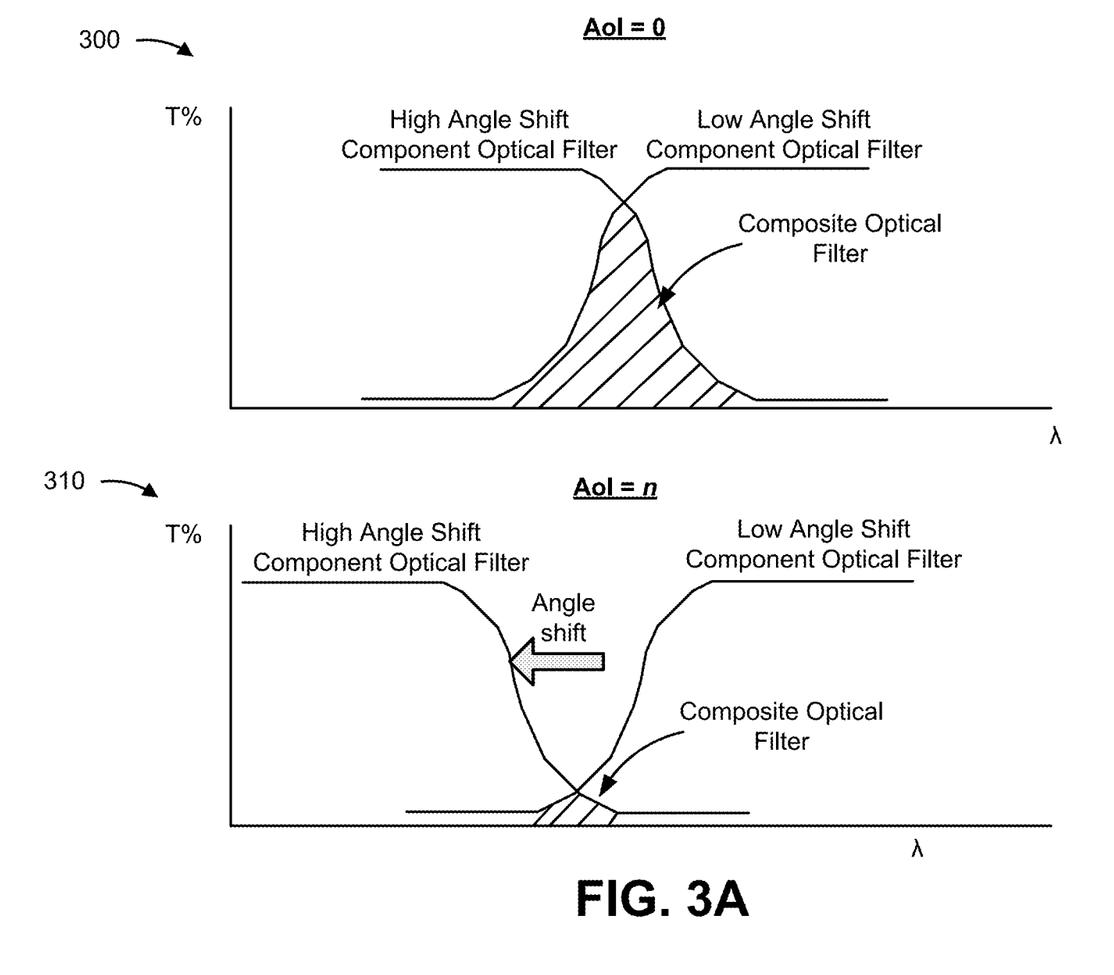
FIGS. 3A-3E are diagrams of example characteristics relating to optical filters described herein.

As shown in FIG. 3A, and by diagrams 300 and 310, a transmissivity relative to wavelength is determined for a high angle shift component optical filter and a low angle shift component optical filter at an angle of incidence of 0 degrees and an angle of incidence of n degrees, respectively. In some implementations, the low angle shift component optical filter may be a long wave pass (LWP) component optical filter that corresponds to first component optical filter 220 of FIG. 2A. In some implementations, the high angle shift component optical filter may be a short wave pass (SWP) component optical filters that corresponds to second component optical filter 230 of FIG. 2A.

In some implementations, a passband of the high angle shift component optical filter and the low angle shift component optical filter may be configured based on a configured layer thickness, a configured material type, and/or the like. A transmissivity of a composite optical filter that includes the high angle shift component optical filter and the low angle shift component optical filter may be a product of respective transmissivities of the high angle shift component optical filter and the low angle shift component optical filter. For example, the composite optical filter described with regard to FIG. 3A, may correspond to optical filter 200 of FIG. 2A. In some implementations, a change in an angle of incidence may result in a change to a transmissivity of the composite optical filter. For example, as shown, the composite optical filter may be associated with a reduced transmissivity at the angle of incidence of n degrees (e.g., where n is greater than a threshold angle) relative to at an angle of incidence of 0 degrees.

Figure 3B:
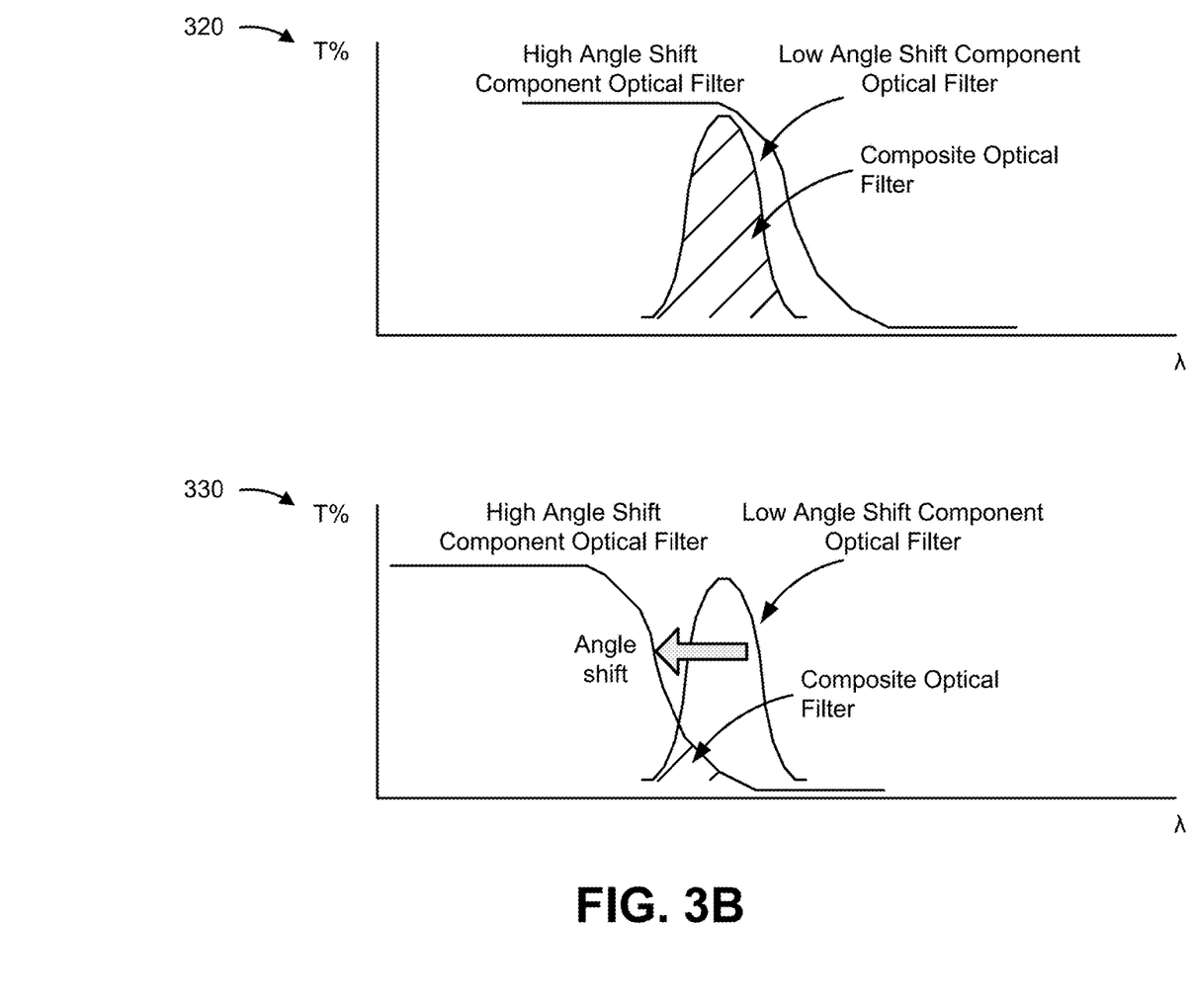

As shown in FIG. 3B, and by diagrams 320 and 330, a transmissivity relative to wavelength is determined for a high angle shift component optical filter and a low angle shift component optical filter at an angle of incidence of 0 degrees and an angle of incidence of n degrees, respectively. As shown, different passbands may be used to manufacture a composite optical filter to provide blocking of light at different angles of incidence. For example, in this case, the low angle shift component optical filter is associated with a passband different from the passband of the low angle shift component optical filter of FIG. 3A.

Figure 3C:
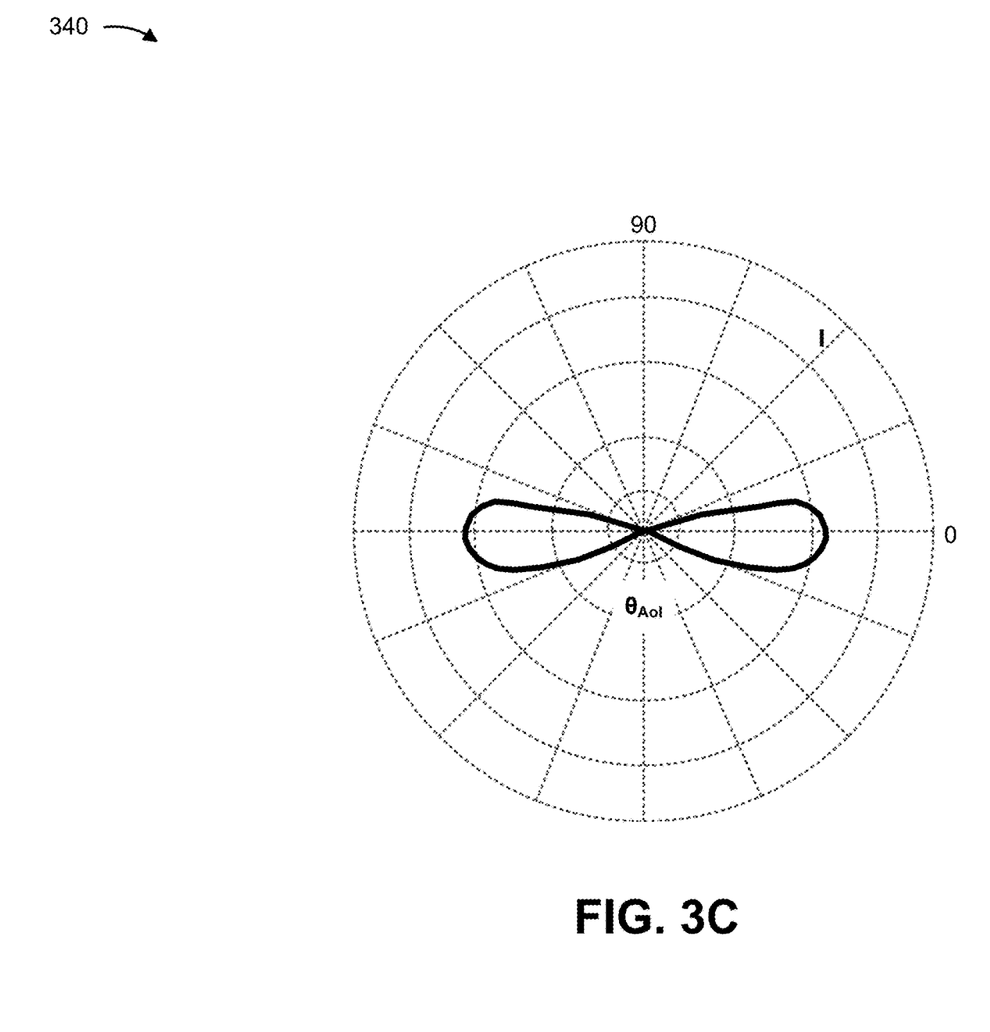

As shown in FIG. 3C, and by diagram 340, an intensity (I) of light passing through the composite optical filter of FIG. 3A and/or the composite optical filter of FIG. 3B relative to an angle of incidence ($\theta_{AoI}$) is determined. For example, at a configured angle of incidence shown in diagrams 300 and 320, an intensity of light passing through the respective composite optical filters may be at a maximum (e.g., a maximum transmissivity), and at angles of incidence greater than a threshold, as shown in diagrams 310 and 330, the intensity of light may be less than a threshold. In this way, the composite optical filters block light associated with angles of incidence greater than a threshold.

Figure 3D:
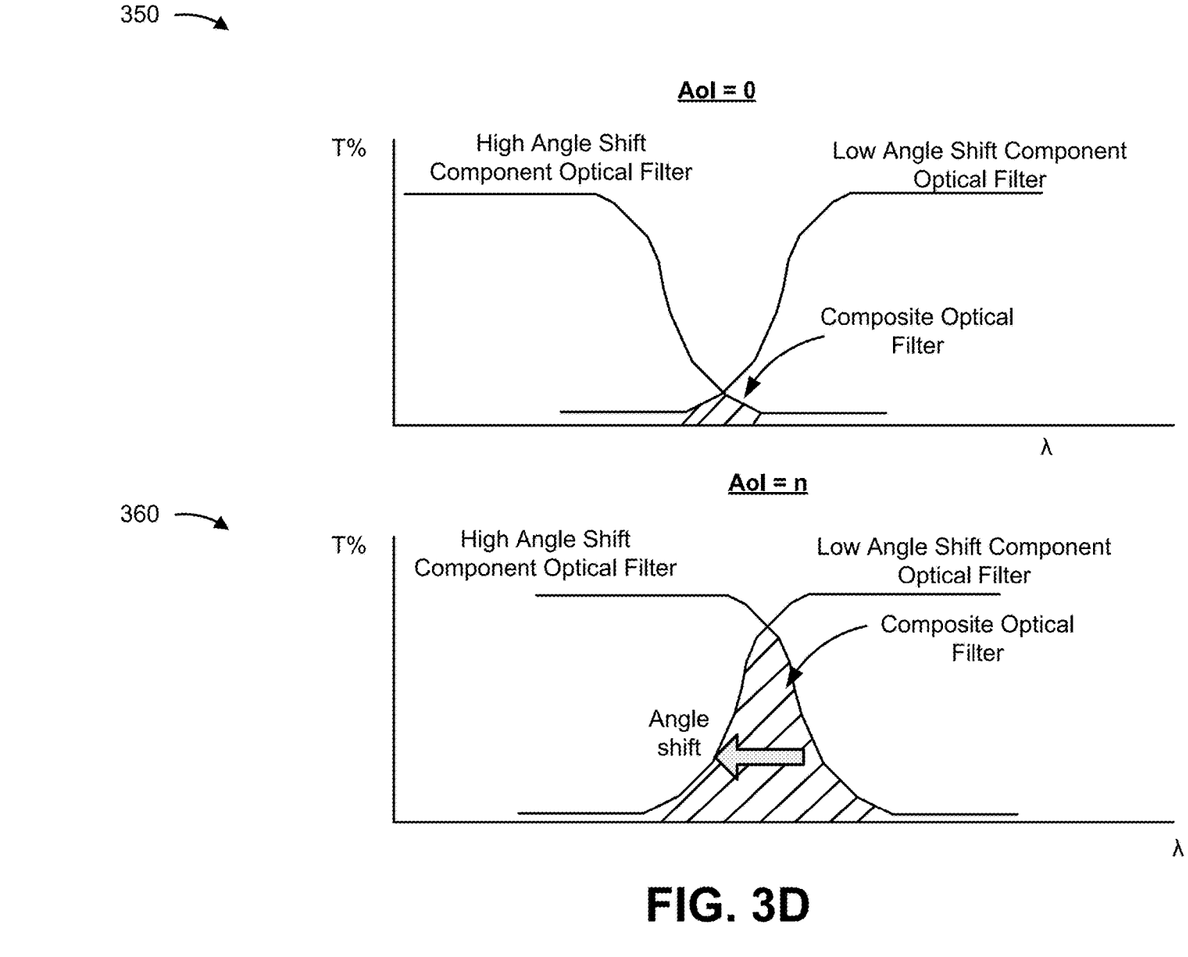

As shown in FIG. 3D, and by diagram 350 and 360, transmissivity relative to wavelength is determined for a high angle shift component optical filter and a low angle shift component optical filter at an angle of incidence of 0 degrees and an angle of incidence of n degrees (e.g., where n is greater than a threshold angle). In some implementations, the long angle shift component optical filter may be a long wave pass component optical filters that corresponds to first component optical filter 220' of FIG. 2B. In some implementations, the high angle shift component optical filter may be a short wave pass component optical filter that corresponds to second component optical filter 230' of FIG. 2B. In some implementations, a passband of the high angle shift component optical filters and the low angle shift component optical filters may be configured based on a configured layer thickness, a configured material type, and/or the like. A transmissivity of a composite optical filter that includes a high angle shift component optical filter and a low angle shift component optical filter may be a product of respective transmissivities of the high angle shift component optical filter and the low angle shift component optical filter. For example, the composite optical filter described with regard to FIG. 3D may correspond to optical filter 200' of FIG. 2B. In this case, an angle shift from 0 degrees to n degrees results in an increase to a transmissivity of the composite optical filter based on configurations of the respective component optical filters.

Figure 3E:
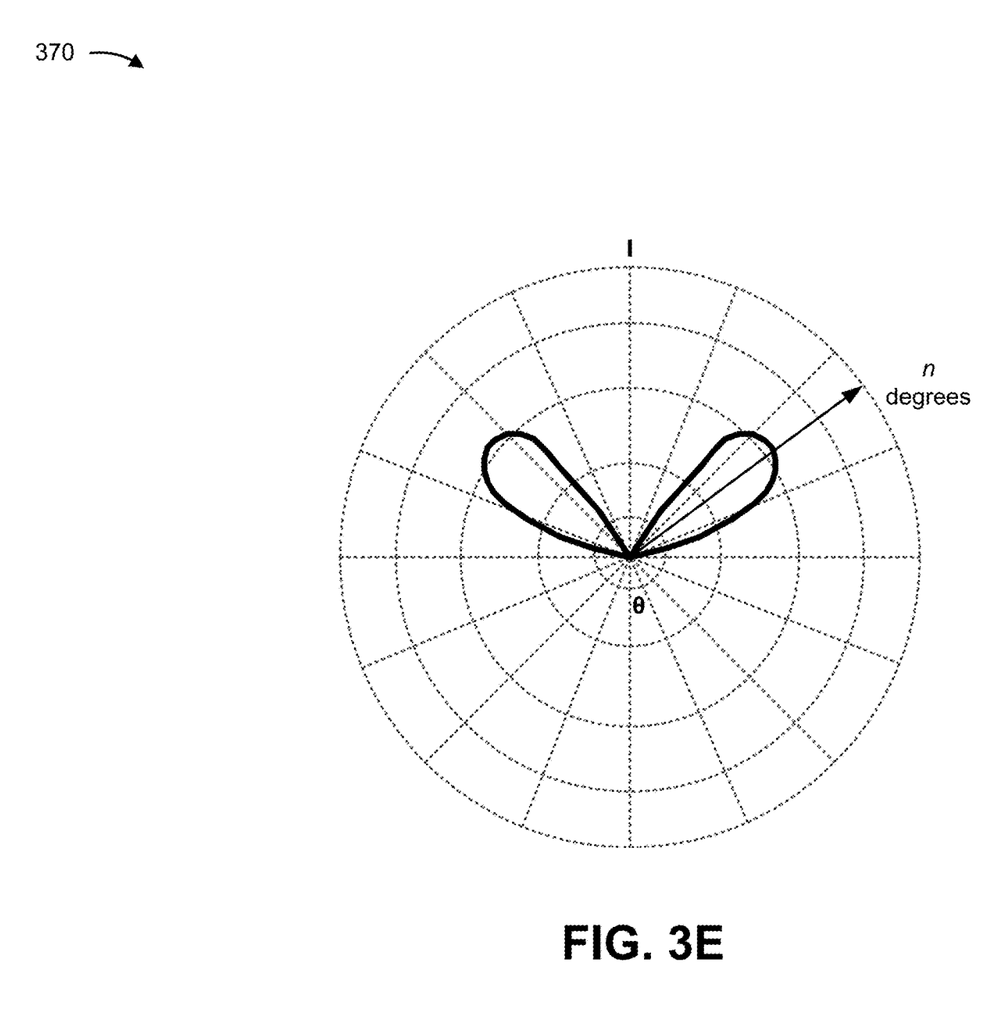

As shown in FIG. 3E, and by diagram 370, the transmissivity relative to the wavelength is determined for the high angle shift component optical filter and the low angle shift component optical filter at differing angles of incidence. In this case, the composite optical filter is associated with greater than a threshold transmissivity based on the high angle shift component optical filter transmissivity shifting to overlap with the low angle shift component optical filter transmissivity at an angle of incidence of n. In contrast, at a configured angle of incidence an intensity of light passing through the composite optical filter may be at a minimum (e.g., a minimum transmissivity). In this way, the composite optical filters blocks light associated with angles of incidence less than or equal to a threshold.

As indicated above, FIG. 3A-3E is provided merely as an example. Other examples are possible and may differ from what was described with regard to FIG. 3A-3E.

In this way, an (composite) optical filter that includes a low angle shift (component) optical filter and a high angle shift (component) optical filter enables angle of incidence restriction. For example, the optical filter may enable a threshold percentage of light to pass through the optical filter at a configured angle of incidence and may block a threshold percentage of light at a threshold angle of incidence. In this way, the optical filter obviates a need for an aperture to be optically coupled to an optical device, thereby reducing a cost, complexity, and/or size of the optical device.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A composite optical filter, comprising:
   a substrate;
   a first component optical filter disposed onto the substrate,
      wherein the first component optical filter is associated with a first angle shift,
      wherein the first component optical filter is a low angle shift passband filter manufactured using hydrogenated silicon (Si:H),
      wherein the low angle shift passband filter is associated with less than 20% angle shift at a particular range of angles of incidence, and
      wherein the particular range of angles of incidence is a range of approximately 0 degrees to approximately 60 degrees; and
   a second component optical filter disposed onto the first component optical filter,
      wherein the second component optical filter is associated with a second angle shift that is different from the first angle shift, and
      wherein the composite optical filter is configured to be transmissive to light at a first range of angles of incidence and is configured to block light at a second range of angles of incidence that is different from the first range of angles of incidence.

2. The composite optical filter of claim 1, wherein the first range of angles of incidence is between approximately 0 degrees and approximately 30 degrees.

3. The composite optical filter of claim 1, wherein the first range of angles of incidence is between approximately 0 degrees and approximately 45 degrees.

4. The composite optical filter of claim 1, wherein the second range of angles of incidence is greater than approximately 30 degrees.

5. The composite optical filter of claim 1, wherein the second range of angles of incidence is greater than approximately 45 degrees.

6. The composite optical filter of claim 1, wherein the second range of angles of incidence is between approximately 0 degrees and approximately 30 degrees and wherein the first range of angles of incidence is greater than approximately 30 degrees.

7. The composite optical filter of claim 1, wherein the composite optical filter is transmissive to greater than a threshold percentage of light at the first range of angles of incidence, and
wherein the threshold percentage is at least one of:
approximately 75%,
approximately 90%,
approximately 95%,
approximately 99%,
approximately 99.9%,
approximately 99.99%, or
approximately 99.999%.

8. The composite optical filter of claim 1, wherein the composite optical filter is configured to block a threshold percentage of light at the second range of angles of incidence, and
wherein the threshold percentage is at least one of:
approximately 75%,
approximately 90%,
approximately 95%,
approximately 99%,
approximately 99.9%,
approximately 99.99%, or
approximately 99.999%.

9. The composite optical filter of claim 1, wherein the composite optical filter is configured to be transmissive to light at a particular spectral range at the first range of angles of incidence and is configured to block light at the particular spectral range at the second range of angles of incidence.

10. The composite optical filter of claim 9, wherein the particular spectral range is between at least one of:
approximately 600 nanometers (nm) and approximately 1200 nm,
approximately 700 nm and approximately 1100 nm, or
approximately 800 nm and approximately 1000 nm.

11. The composite optical filter of claim 9, wherein the particular spectral range is between at least one of:
approximately 1200 nanometers (nm) and approximately 2000 nm,
approximately 1400 nm and approximately 1800 nm, or
approximately 1500 nm and approximately 1700 nm.

12. The composite optical filter of claim 9, wherein the particular spectral range is between at least one of:
approximately 200 nanometers (nm) and approximately 4000 nm,
approximately 1000 nm and approximately 3000 nm, or
approximately 1500 nm and approximately 2500 nm.

13. An optical system, comprising:
an optical filter including a plurality of component optical filters configured to filter an input optical signal and provide a filtered input optical signal,
wherein the plurality of component optical filters is configured to block a first portion of the input optical signal that does not satisfy an angle of incidence threshold and to pass a second portion of the input optical signal that does satisfy the angle of incidence threshold,
wherein the plurality of component optical filters include a low angle shift filter manufactured using hydrogenated silicon (Si:H),
wherein the low angle shift filter is associated with less than 20% angle shift at a particular range of angles of incidence, and
wherein the particular range of angles of incidence is a range of approximately 0 degrees to approximately 60 degrees; and
an optical sensor configured to receive the filtered input optical signal and provide an output electrical signal.

14. The optical system of claim 13, wherein a maximum transmissivity of the optical filter is at a lesser angle of incidence than a minimum transmissivity of the optical filter.

15. The optical system of claim 13, wherein the low angle shift filter is a long wave pass (LWP) optical filter.

16. The optical system of claim 13, wherein the plurality of component optical filters further include a short wave pass (SWP) optical filter.

17. A filter, comprising:
a first component filter associated with a first angle shift and a first passband,
wherein the first component filter is a low angle shift filter manufactured using hydrogenated silicon (Si:H),
wherein the low angle shift filter is associated with less than 20% angle shift at a particular range of angles of incidence, and
wherein the particular range of angles of incidence is a range of approximately 0 degrees to approximately 60 degrees; and
a second component filter associated with a second angle shift and a second passband,
wherein the first angle shift, the first passband, the second angle shift, and the second passband are configured to make the filter transmissive to a spectral range of light at a first angle of incidence and reflective to the spectral range of light at a second angle of incidence.

18. The filter of claim 17, wherein the first angle of incidence is less than approximately 30 degrees and the second angle of incidence is greater than or equal to approximately 30 degrees.

19. The filter of claim 17, wherein at least one layer of the second component filter is a tantalum pentoxide ($Ta_2O_5$) material.

20. The filter of claim 17, wherein the filter is a collimator.

* * * * *